March 12, 1957
F. A. GROSZ ET AL
2,784,662
CABINET FOR BAKERY PRODUCTS
Filed Oct. 28, 1954
2 Sheets-Sheet 1
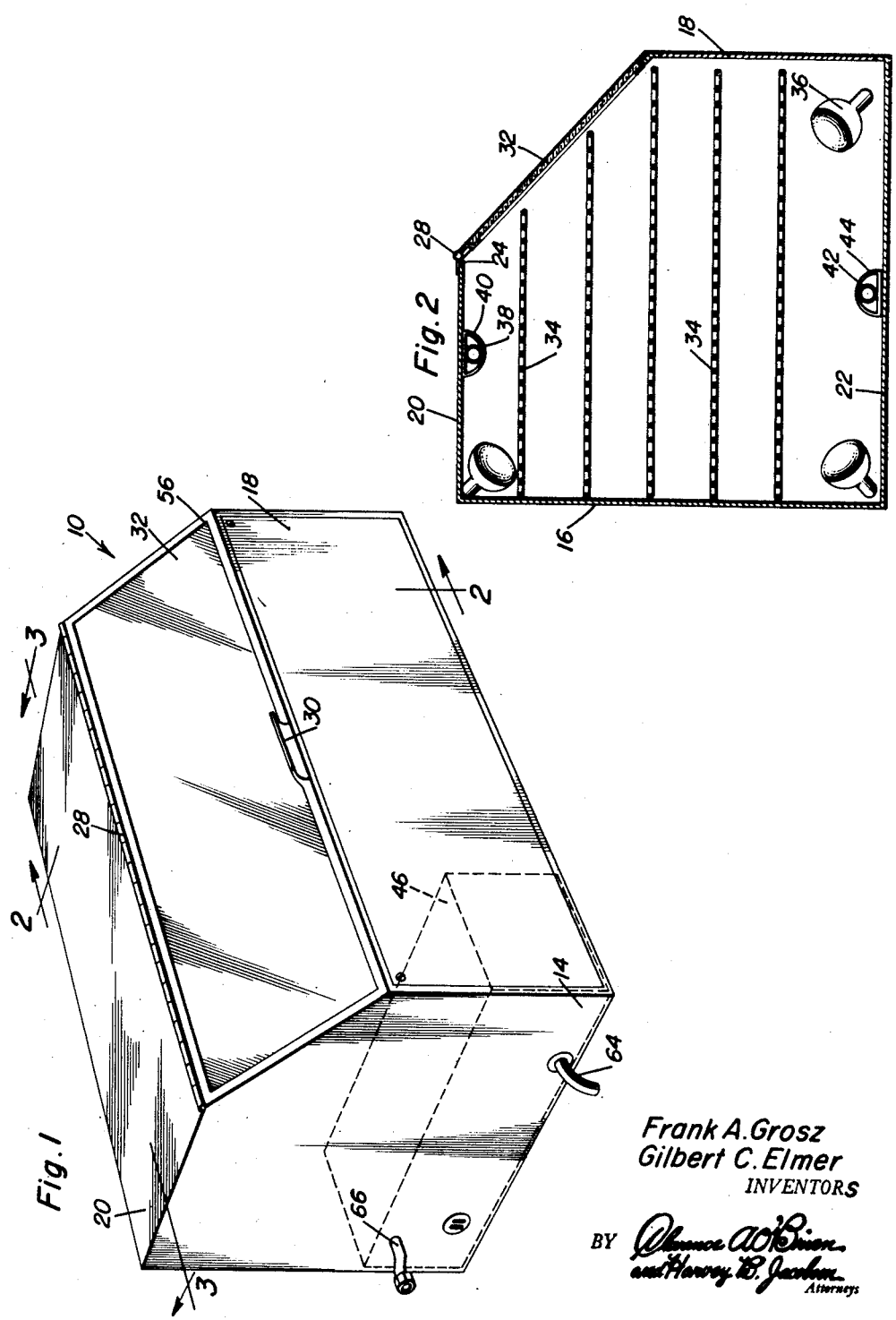
Frank A. Grosz
Gilbert C. Elmer
INVENTORS

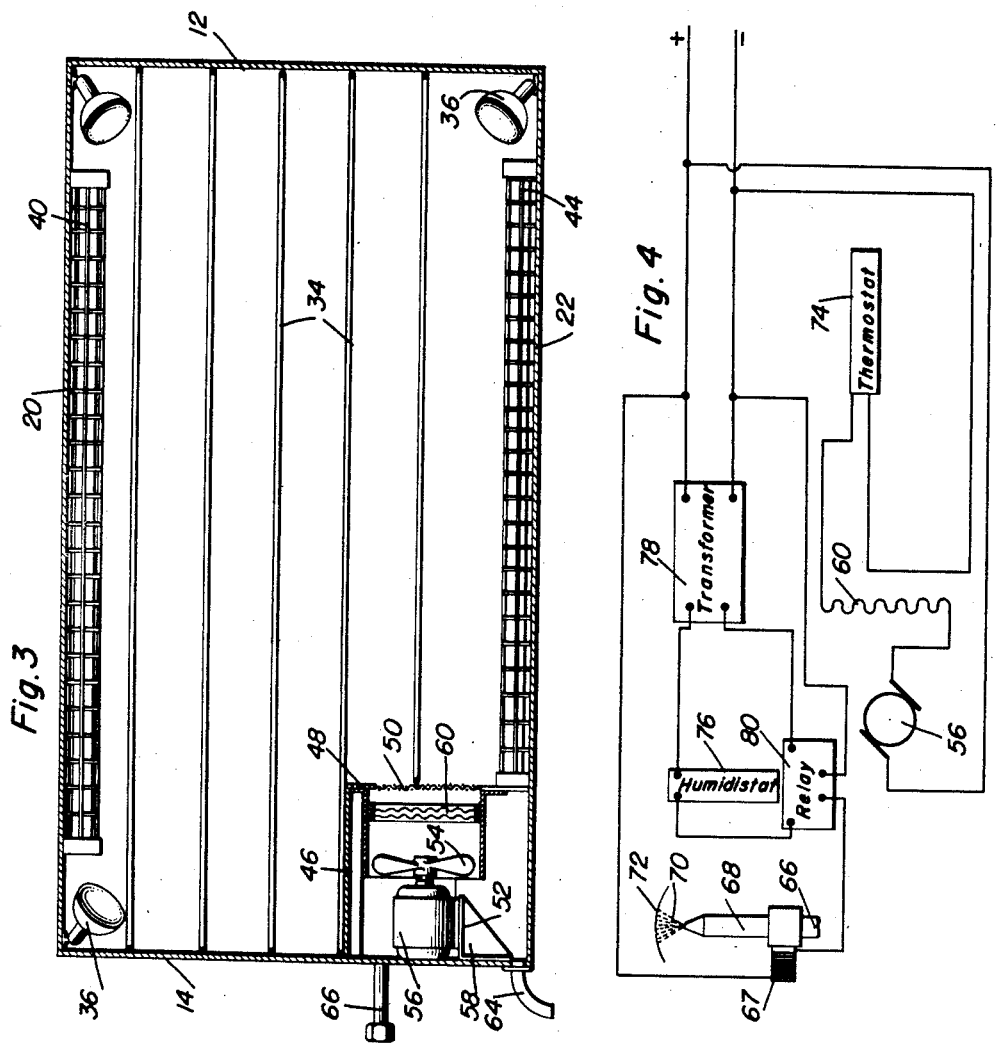

2,784,662

CABINET FOR BAKERY PRODUCTS

Frank A. Grosz and Gilbert C. Elmer, New Orleans, La.

Application October 28, 1954, Serial No. 465,212

1 Claim. (Cl. 99—271)

This invention relates to cabinets and more specifically provides a cabinet for bakery products.

An object of this invention is to provide a cabinet especially designed for bakery products in order to retain such products in a desired condition.

It is well known that bakery products such as bread and other perishable items cannot be retained at a high degree of freshness for a prolonged period of time before such articles become stale and unfit for human consumption. Accordingly, it is an object of the present invention to provide a cabinet that is so conditioned to retain the bakery products in a fresh condition for a long period of time.

A further object of the present invention is to provide a cabinet having means for conditioning the humidity, heat and controlling the growth of bacteria and fungi thereby retaining the bakery products in the desired condition.

Other important objects of the present invention reside in its simplicity of construction, ease of use, its retention of bakery products in the desired fresh condition for long periods of time, its adaptability for its purposes and its relatively inexpensive manufacture and maintenance.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the cabinet for bakery products of the present invention;

Figure 2 is a transverse, vertical sectional view taken substantially upon a plane passing along section line 2—2 of Figure 1 showing the interior details of construction of the cabinet;

Figure 3 is a longitudinal, vertical sectional view taken substantially upon a plane passing along section line 3—3 of Figure 1 showing further structural details of the cabinet; and Figure 4 is a diagrammatic view showing a wiring diagram utilized in the cabinet of the present invention.

Referring now specifically to the drawings in detail, it will be seen that the numeral 10 generally designates the cabinet for bakery products of the present invention. The cabinet 10 is in the nature of an enclosure formed by end walls 12 and 14, a rear wall 16, a front wall 18, a top wall 20 and a bottom wall 22. The front wall 18 is provided with an enlarged inclined opening 24 which is formed by inclined upper corners on the end walls 12 and 14. An enlarged closure 26 is hingedly connected to the front edge of the top wall 20 by hinge member 28. A handle 30 is provided along the lower edge of the closure 26 for operation thereof. A glass or other transparent panel 32 is provided in the closure 26 for viewing the inner portion of the cabinet 10.

A plurality of vertically spaced longitudinally disposed shelves 34 are positioned within the interior of the cabinet 10 and the shelves 34 are generally formed of spaced rods to permit circulation of air through the shelves 34 and around bakery products such as bread that may be positioned on the upper surface of the shelves 34.

In at least three corners of the cabinet 10 adjacent the end wall 12 is mounted fungicidal lamps 36 and in at least one corner adjacent the end wall 14 is also mounted another fungicidal lamp 36. Centrally disposed on the inner surface of the top member 20 is an elongated bactericidal light 38 having a shield 40 thereon. Positioned centrally of the bottom wall 22 is another bactericidal light 42 having a shield 44 thereover thereby protecting persons normally reaching into the cabinet 10 from excessive exposure to the rays emitted by the bactericidal lights 38 and 42.

Adjacent one end 14 of the cabinet 10 and at the lower edge thereof is a compartment formed by a top wall 46 and an end wall 48. Within the end wall 48 is a reticulated screen 50 for communicating the interior of the compartment with the interior of the cabinet enclosure. Positioned on the inner surface of the end wall 48 is an inwardly extending cylindrical flange 52 which houses a fan 54 that is driven by an electric motor 56 resting on a suitable bracket 58. Positioned forwardly of the fan 54 is an electric resistance type heating coil 60 wherein air may be circulated over the heating coil 60 and out through the screen 50 and into the interior of the cabinet 10 thereby heating the interior of the cabinet 10 to a desired temperature. At the bottom of the compartment is a suitable condensation drain 64 and at the other end of the compartment is a water inlet pipe 66 which supplies water to a spray nozzle 68 which directs water vapor spray 70 toward a baffle 72 wherein water spray 70 will be introduced into the interior of the cabinet 10 as water vapor. The fan 54 will circulate air through the compartment in which the spray nozzle 68 is located thereby efficiently forming a water vapor for introduction into the interior of the cabinet 10.

As illustrated in Figure 4, a thermostat 74 is provided for controlling the actuation of the heating element 60 and a humidistat 76 is provided for controlling the operation of the humidifying nozzle 68 by means of a solenoid valve 67.

It will be seen that the humidistat 76 is connected to a step-down transformer 78 and a relay 80 wherein the humidistat will operate at a low voltage and act through the relay 80 for connecting the solenoid valve 67 to the line voltage.

In operation, heat of around 130° Fahrenheit, more or less, together with a relative humidity of 90% plus or minus five has been found most favorable in order to retain the bakery products in a fresh condition. These conditions will retain the bakery products so that they will not dry out and will be retained in a warm, oven-fresh condition for relatively long periods of time.

Also, it will be understood that suitable illumination, insulation and other structural details will be provided in the cabinet 10 but form no critical part of the present invention. The thermostat and humidistat retain the interior of the cabinet 10 in the desired temperature range and humidity range and the bactericidal and fungicidal lamps prevent the growth of bacteria or mold or other fungi within the interior of the cabinet 10 thereby providing a cabinet that will retain bakery products such as bread in a fresh condition thereby eliminating the large waste of such bakery products necessary because these products normally become stale at a rapid rate.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A cabinet for bakery products comprising an enclosure having an end and a bottom, an air and spray mixing compartment in one end and the bottom of the enclosure having an opening into the enclosure, means for heating the interior of the enclosure, means for killing bacteria and mold positioned within said enclosure, said bacteria and mold killing means including bactericidal lamps and fungicidal lamps, said heating means including a resistance heating element in said opening and a fan having a motor in said compartment for circulating air over the heating element into the enclosure, and means for humidifying the air in the compartment to humidify the interior of the enclosure including a humidistat in said enclosure and a spray nozzle for introducing moisture spray into the compartment under control of the humidistat thereby raising the relative humidity in the enclosure, a cylindrical member in said compartment extending from said opening and in which said fan is housed, and a screen in said cylindrical member between said fan and said heating element.

References Cited in the file of this patent

UNITED STATES PATENTS

| | | |
|---|---|---|
| 2,251,617 | Pirnie | Aug. 5, 1941 |
| 2,315,285 | Dennington | Mar. 30, 1943 |
| 2,650,882 | Sperti | Sept. 1, 1953 |
| 2,711,471 | Sussman | June 21, 1955 |